United States Patent
Jain et al.

(10) Patent No.: US 9,935,867 B2
(45) Date of Patent: Apr. 3, 2018

(54) DIAGNOSTIC SERVICE FOR DEVICES THAT EMPLOY A DEVICE AGENT

(71) Applicant: Dell Products L.P., Round Rock, TX (US)

(72) Inventors: Shailesh Jain, Bangalore (IN); Prashanth Devendrappa, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 99 days.

(21) Appl. No.: 15/067,555

(22) Filed: Mar. 11, 2016

(65) Prior Publication Data

US 2017/0264527 A1   Sep. 14, 2017

(51) Int. Cl.
*H04L 12/26* (2006.01)
*H04L 29/08* (2006.01)
*H04L 12/24* (2006.01)

(52) U.S. Cl.
CPC .......... *H04L 43/50* (2013.01); *H04L 41/0631* (2013.01); *H04L 67/10* (2013.01)

(58) Field of Classification Search
CPC ...... H04L 43/50; H04L 67/10; H04L 41/0631
See application file for complete search history.

(56) References Cited

U.S. PATENT DOCUMENTS

| | | | |
|---|---|---|---|
| 2014/0282427 A1* | 9/2014 | Fanning | G06F 11/366 717/128 |
| 2015/0289152 A1* | 10/2015 | Shanmugam | H04W 24/06 455/425 |
| 2016/0098334 A1* | 4/2016 | Hariharakrishnan | G06F 11/3013 702/186 |

* cited by examiner

*Primary Examiner* — Jianye Wu
(74) *Attorney, Agent, or Firm* — Kirton McConkie; Brian Tucker (57) ABSTRACT

A diagnostic service can be provided for devices that include a device agent for allowing the devices to be managed. The diagnostic service can operate on a managed device to monitor and manage the device agent. To facilitate communication between the management server and the diagnostic service, the diagnostic service can obtain connection information and an authentication code from the device agent after the device agent has registered with the management server. The diagnostic service can then employ the connection information and authentication code to register with the management server. Once the diagnostic service is registered, the management server can employ the diagnostic service to monitor and manage the device agent.

20 Claims, 8 Drawing Sheets

DIAGNOSTIC SERVICE FOR DEVICES THAT EMPLOY A DEVICE AGENT

CROSS-REFERENCE TO RELATED APPLICATIONS

N/A

BACKGROUND

The present invention is generally directed to a diagnostic service that can be employed on devices that also include a device agent for managing the device as part of a device management platform. In particular embodiments of the present invention, a device agent and a diagnostic service can be installed on a large number of thin client devices to facilitate management of the devices from the cloud.

A number of different device management platforms exist including, for example, Dell's Cloud Client Manager. These device management platforms can allow a number of different types of devices, including, for example, thin clients, zero clients, tablets, and smartphones, to be monitored and managed from a single location (i.e., from the cloud). To allow this monitoring and management, a device agent is installed on each device so that the management server can communicate with the device agent to implement a desired type of monitoring or management. Such devices will hereafter be referred to as "managed devices."

Although these device agents are effective when operating properly, if a device agent becomes unresponsive or otherwise fails to operate correctly, it will typically become impossible to monitor or manage the managed device from the management server. When this occurs, it will typically be necessary to physically visit the location of the managed device to perform a diagnosis of the failure. However, in environments where there are possibly hundreds or thousands of managed devices spread geographically, it may not be feasible to do so.

BRIEF SUMMARY

The present invention extends to methods, systems, and computer program products for providing a diagnostic service for managed devices. The diagnostic service can operate on a managed device to monitor and manage the device agent. To facilitate communication between the management server and the diagnostic service, the diagnostic service can obtain connection information and an authentication code from the device agent after the device agent has registered with the management server. The diagnostic service can then employ the connection information and authentication code to register with the management server. Once the diagnostic service is registered, the management server can employ the diagnostic service to monitor and manage the device agent.

In some embodiments, the present invention is implemented by a diagnostic service that is installed on a device that also includes a device agent as a method for enabling the device agent to be monitored and managed as part of a device management platform. The diagnostic service can register with a management server of the device management platform. The diagnostic service can then receive a diagnostic request from the management server. The diagnostic request defines one or more actions that the diagnostic service should perform to monitor or manage the device agent. The diagnostic service can then perform the one or more actions defined in the diagnostic request and send a diagnostic response to the management server indicating a result of the one or more actions.

In other embodiments, the present invention is implemented by a management server of a device management platform as a method for employing a diagnostic service installed on a device to monitor and manage a device agent that is also installed on the device. As part of registering the device agent, the management server can send the device agent an authentication code that is associated with the device agent. The management server can receive a registration request from the diagnostic service which includes the authentication code and an identifier of the diagnostic service. The management server can employ the authentication code and the identifier of the diagnostic service to associate the device agent with the diagnostic service. Then, the management server can send a diagnostic request to the diagnostic service. The diagnostic request defines one or more actions that the diagnostic service should perform to monitor or manage the device agent.

In other embodiments, the present invention is implemented as a device management platform that includes: a management server; a device agent installed on each of a plurality of devices; and a diagnostic service installed on each of the plurality of devices. The management server communicates with the device agent to monitor or manage the device, and also communicates with the diagnostic service to monitor or manage the device agent.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification, a managed device should be construed as any type of computing device that includes a device agent of a device management platform. Managed devices may typically be thin clients or mobile devices. However, a desktop or laptop computer may also be a managed device.

Figure 1:
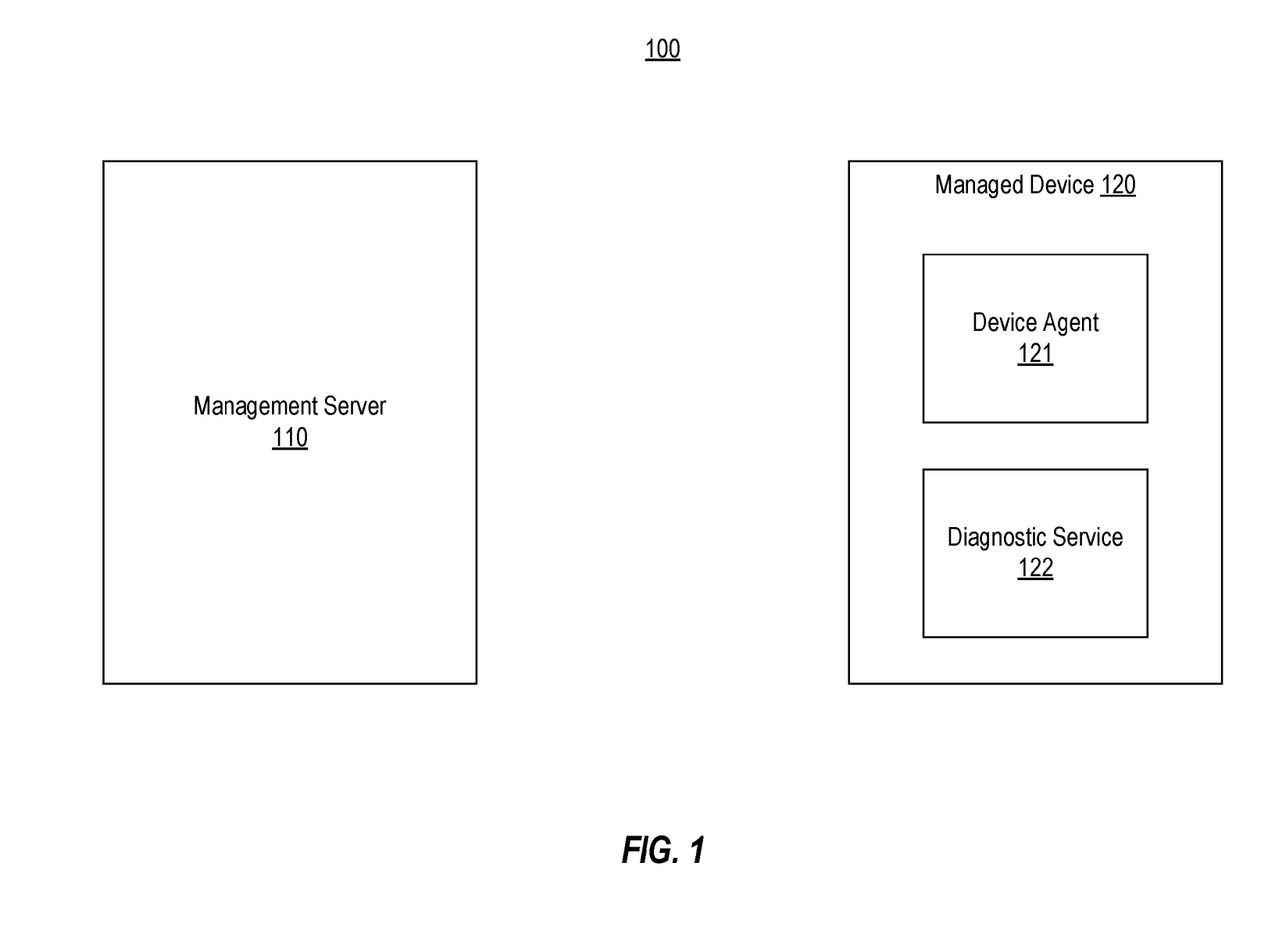
FIG. 1 illustrates an example computing environment in which the present invention can be implemented.

FIG. 1 illustrates an example computing environment 100 in which the present invention can be implemented. Computing environment 100 includes a management server 110 and a number of managed devices 120 (only one of which is depicted). Each managed device 120 includes a device agent 121 and a diagnostic service 122. The combination of management server 110, device agent 121, and diagnostic service 122 can be collectively referred to as a device management platform. Management server 110 can be configured to communicate with device agent 121 and diagnostic service 122 to implement a number of different types of management functions.

As was addressed in the background, if managed device 120 only included device agent 121 and device agent 121 failed to operate properly, management server 110 would not be able to adequately manage managed device 120. Therefore, in accordance with embodiments of the present invention, managed device 120 may also include diagnostic service 122 which can function as a means for monitoring and managing device agent 121.

Figure 2A:
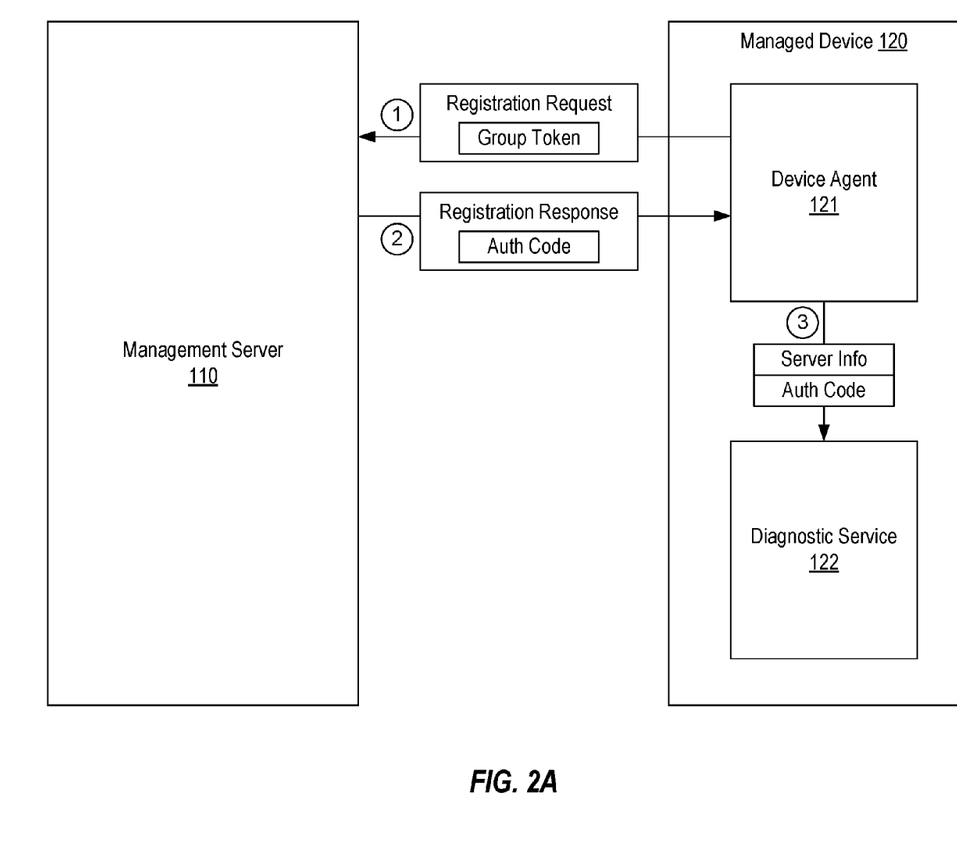
FIGS. 2A-2C illustrate a process for registering a device agent and a diagnostic service with a management server so that the management server can separately communicate with the device agent and the diagnostic service.
Figure 2B:
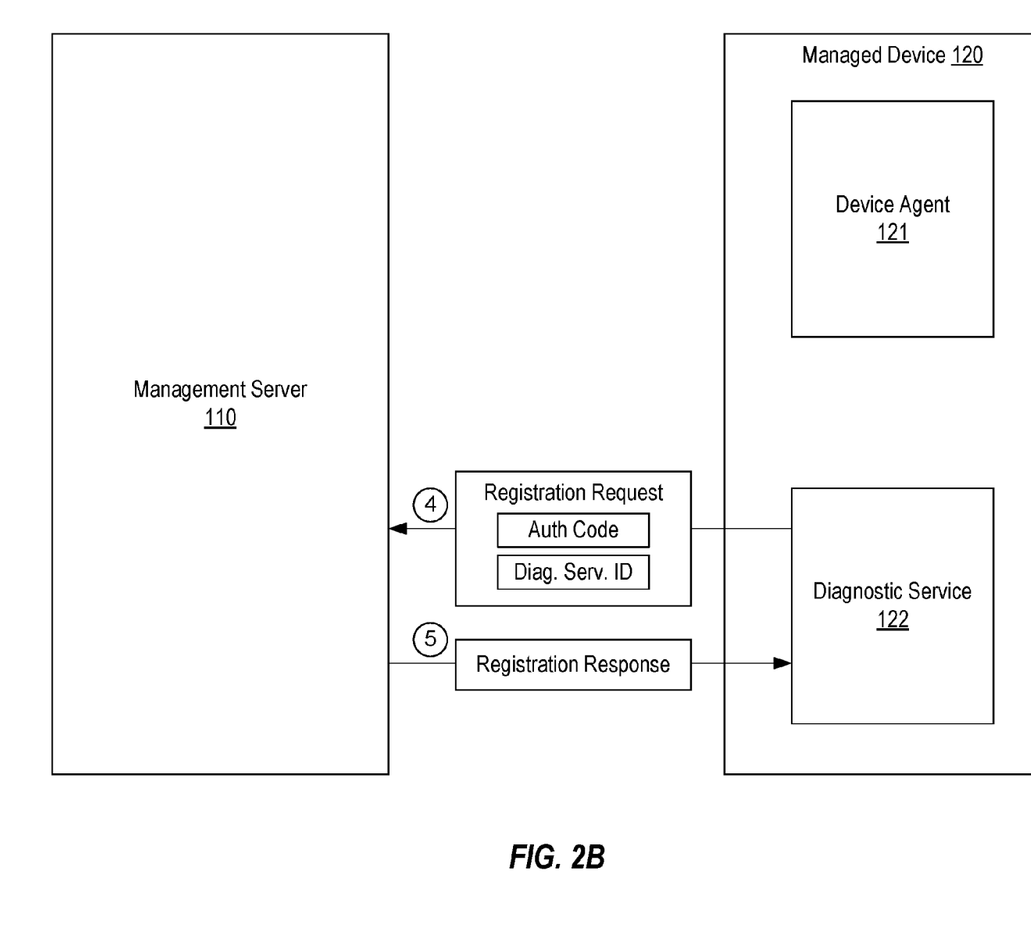
Figure 2C:
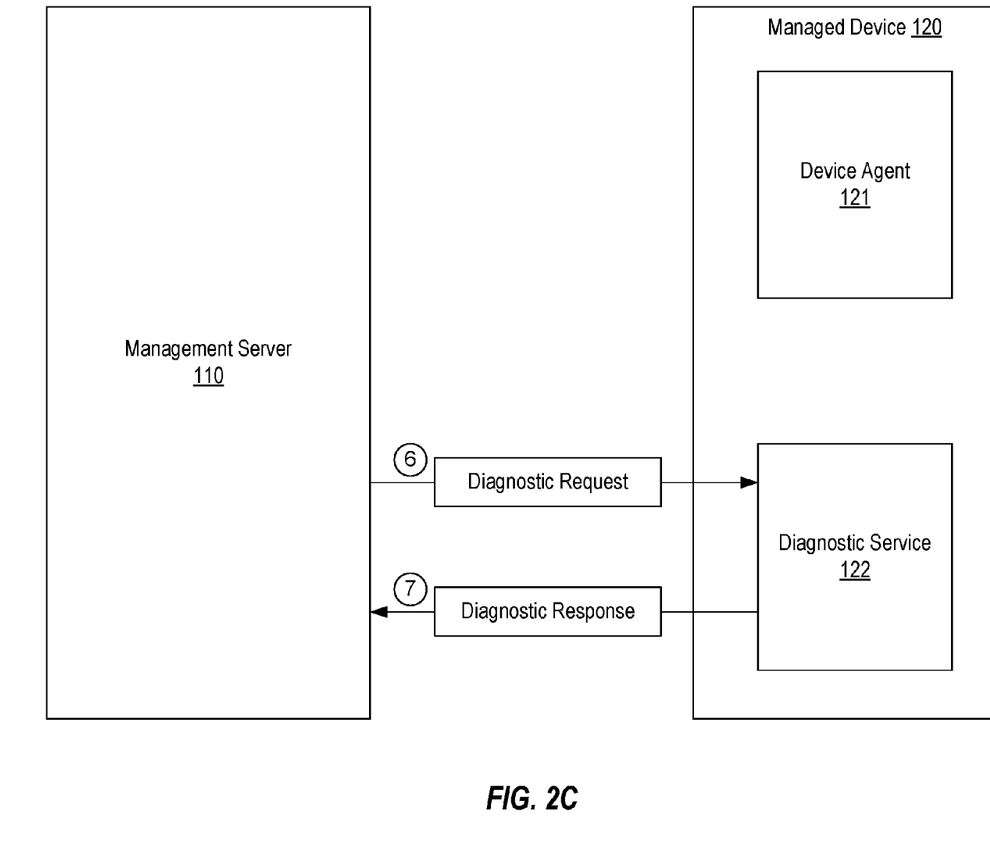

To enable management server 110 to communicate with diagnostic service 122, diagnostic service 122 can be configured to register with management server 110. This registration can occur in conjunction with the registration of device agent 121 with management server 110. FIGS. 2A-2C illustrate how this registration process can be carried out.

FIG. 2A represents a number of steps that device agent 121 can perform to register with management server 110. As a result of this registration, device agent 121 can obtain information necessary for diagnostic service 122 to register. In particular, in step 1, device agent 121 sends a registration request to management server 110. This registration request is shown as including a group token. The group token can represent any type of identifier or information that can be used to validate the registration request and will typically be provided to device agent 121 as part of an initial configuration of managed device 120.

Although not shown, in some embodiments, the registration request can also include a unique identifier of managed device 120. For example, this unique identifier may be the MAC address of managed device 120. Upon receiving the registration request, and assuming the group token is validated, management server 110 can generate a unique authentication code from the unique identifier included in the registration request. For example, management server 110 may apply an algorithm to the MAC address of managed device 120 to produce a unique authentication code. Alternatively, the authentication code could be the MAC address or other unique identifier of device agent 121.

In step 2, management server 110 can send a registration response to device agent 121 which includes the authentication code. Device agent 121 can then employ the authentication code in any subsequent communication sent to management server 110 to thereby identify itself as the sender of the communication. Additionally, in step 3, device agent 121 can provide the authentication code as well as connection information to diagnostic service 122. For example, device agent 121 could be configured to update a configuration file of diagnostic service 122 to include this information. The connection information can include any information necessary to establish a network connection with management server 110 including, for example, the IP address and port on which management server 110 is listening.

FIG. 2B then depicts steps that diagnostic service 122 can take to register with management server 110. In step 4, diagnostic service 122 sends a registration request to management server 110 that includes an identifier of diagnostic service 122 as well as the authentication code that device agent 121 had previously received from management server 110. Management server 110 can process the registration request by creating an association between diagnostic service 122 and device agent 121 which is possible due to the registration request including both the identifier of the diagnostic service and the authentication code that management server 110 had previously created for device agent 121. Assuming this processing is successful, in step 5, management server 110 can send a registration response to diagnostic service 122 indicating the success.

At this point, both device agent 121 and diagnostic service 122 should be operating and able to communicate with management server 110. Management server 110 can therefore send communications to device agent 121 for the purpose of monitoring and managing managed device 120. Additionally, management server 110 can separately and independently send communications to diagnostic service 122 for the purpose of monitoring and managing device agent 121.

FIG. 2C illustrates steps for how management server 110 may communicate with diagnostic service 122. In step 6, management server 110 sends a diagnostic request to diagnostic service 122. As will be further described below, a number of different types of diagnostic requests may be sent. Diagnostic service 122 can take the appropriate action in response to the diagnostic request. Then, in step 7, diagnostic service 122 can send a diagnostic response to management server 110 indicating the result of performing the action specified in the diagnostic request.

As can be seen from FIG. 2C, even if device agent 121 stops operating properly, management server 110 will still be able to communicate with diagnostic service 122. This will allow management server 110 to remotely diagnose device agent 121. As a result, an administrator may be able to remotely address various issues that would have otherwise required the administrator to physically visit the location of managed device 120.

In some embodiments, diagnostic requests can be structured as JSON objects (i.e., a series of name value/pairs). Each diagnostic request can include an identifier name/value pair and a command name/value pair. The command name/value pair can define the type of diagnostic action that management server 110 is requesting diagnostic service 122 to perform. The identifier name/value pair can define a unique identifier for the diagnostic request. The role of the identifier is to allow management server 110 to associate a diagnostic response with the corresponding diagnostic request. Other name/value pairs may also be included in a diagnostic request based on the type of the request.

Figure 3:
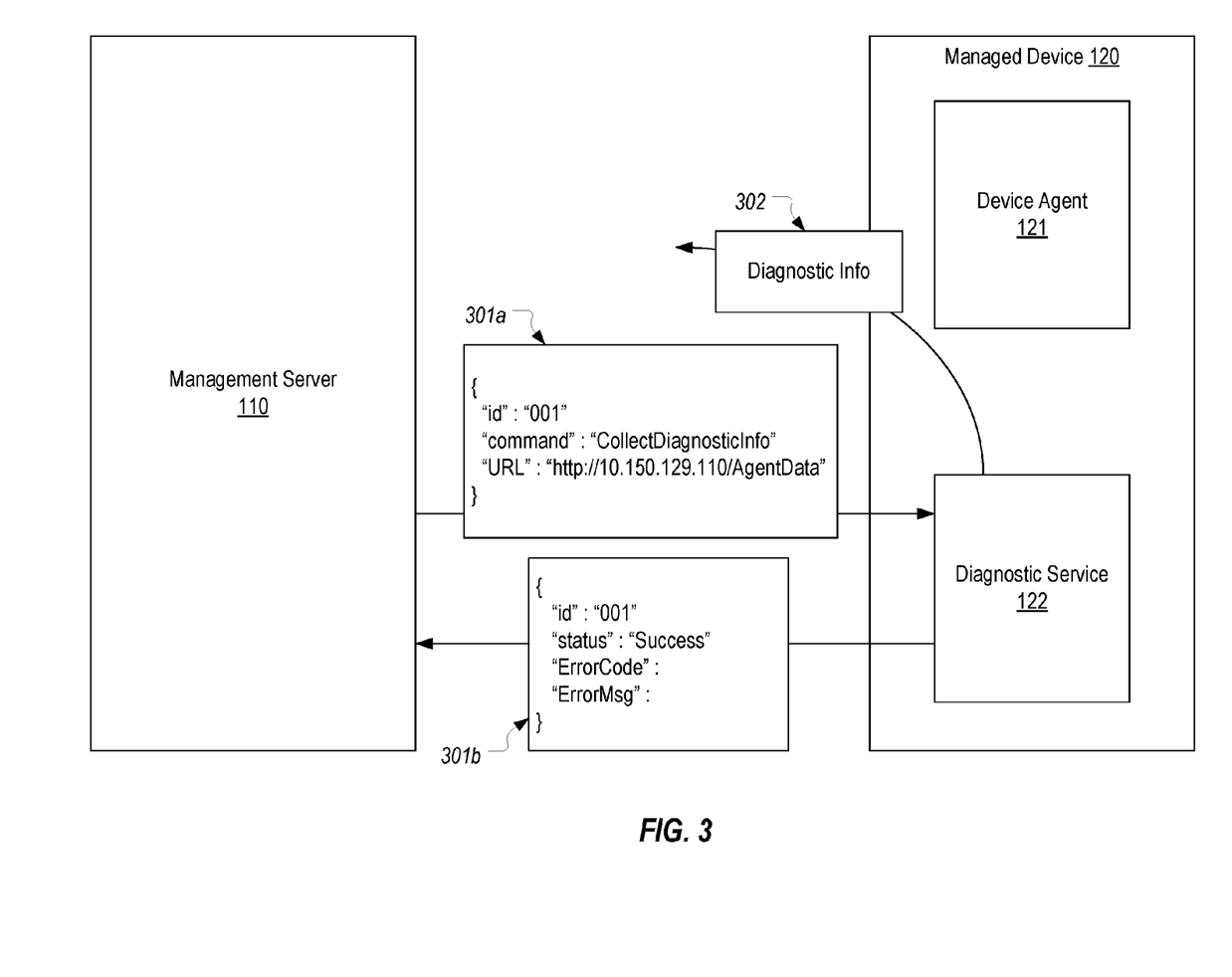
FIGS. 3 and 4 each illustrate an example of a diagnostic request and a corresponding diagnostic response.

For example, FIG. 3 illustrates a portion of a diagnostic request 301a that is structured as a JSON object and represents a request to collect diagnostic information about device agent 121. Diagnostic request 301a specifies an identifier of "001" and a command of "CollectDiagnosticInfo." Additionally, diagnostic request 301a includes a name/value pair of "URL":http://10.150.129.110/AgentData" which defines a URL to which diagnostic service 122 should post the collected diagnostic information.

Upon receiving diagnostic request 301a, diagnostic service 122 can parse the request to determine that management server 110 is requesting that diagnostic service 122 should collect diagnostic information. Diagnostic service 122 can also extract the identifier and URL for later use in creating an appropriate response. To process the CollectDiagnosticInfo command, diagnostic service 122 can collect various types of information about device agent 121 and managed device 120 including, for example, system information (e.g., hardware, software, network, hotfix, and operating system information about managed device 120), a version of device agent 121, a type and status of a write filter employed by device agent 121, logs of device agent 121, any crash dumps, etc.

Once this diagnostic information is collected, diagnostic service 122 can generate the appropriate response to diagnostic request 301a. In this case, because diagnostic information was requested, diagnostic service 122 can generate a diagnostic response 301b as well as a communication 302 for uploading the collected diagnostic information. Diagnostic service 122 can configure diagnostic response 301b to include the identifier "001" which was provided in diagnostic request 301a. By including the identifier in diagnostic response 301b, management server 110 will know that the response pertains to diagnostic request 301a. Diagnostic response 301b also includes a status name/value pair which is used to identify whether the command was completed successfully, an ErrorCode name/value pair which is used to specify an error code if an error occurred, and an ErrorMsg name/value pair which is used to specify an error message if an error occurred. In FIG. 3, it is assumed that diagnostic service 122 successfully collected and uploaded the diagnostic information and therefore diagnostic request 301b includes a status of "Success" and includes a null value for the ErrorCode and ErrorMsg name/value pairs.

As indicated above, diagnostic service 122 can generate communication 302 which includes the collected diagnostic information and send it to the URL specified in diagnostic request 301a. By including the URL in diagnostic request 301a, management server 110 can dynamically control where diagnostic information will be received and collected. For example, the URL may specify a location that is separate from a location of management server 110 as is represented by the arrow in FIG. 3.

Figure 4:
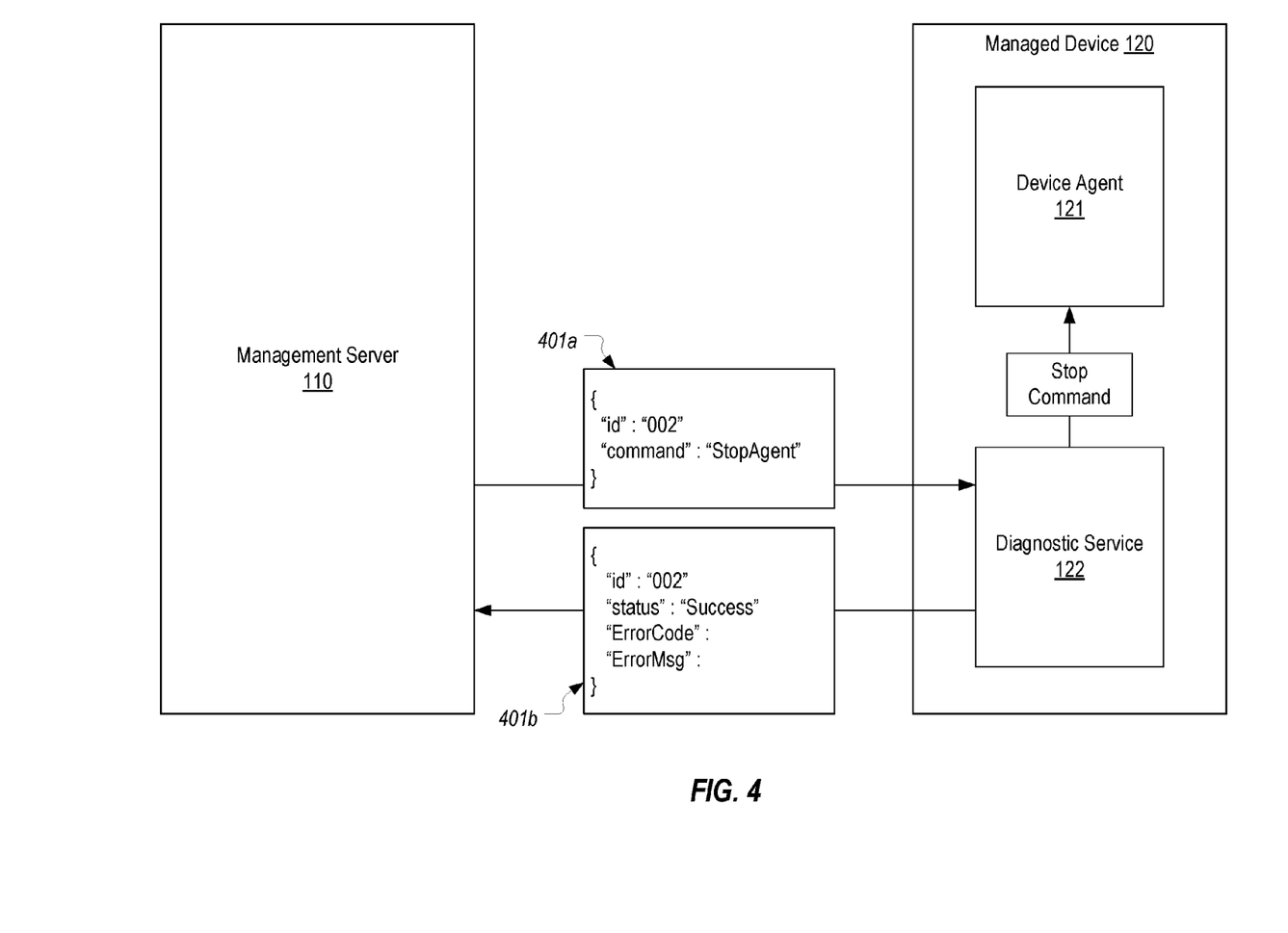

Many other types of diagnostic commands could be sent to diagnostic service 122 in a similar manner. For example, FIG. 4 illustrates a diagnostic request 401a that includes a StopAgent command. In response to this command, diagnostic service 122 can stop device agent 121 and then send a diagnostic response 401b with the appropriate identifier and other values. For example, in FIG. 4, diagnostic response 401b includes an identifier of "002" which matches the identifier included in diagnostic request 401a. Diagnostic response 401b also includes a status of "Success" which indicates that diagnostic service 122 was able to stop the execution of device agent 121.

Other types of diagnostic commands that management server 110 can send to diagnostic service include: a StartAgent command that instructs diagnostic service 122 to cause device agent 121 to start executing; an EnableTrace command that instructs diagnostic service 122 to enable a trace mechanism of device agent 121 which will generate additional debug information as device agent 121 executes; a HealthStatus command that instructs diagnostic service 122 to obtain and upload current health information of device agent 121; a getPerfData command that instructs diagnostic service 122 to obtain and upload current performance data of device agent 121 (e.g., current memory and CPU utilization); and a ResetSettings command that instructs diagnostic service 122 to reset device agent 121 to default settings. Of course, many other types of diagnostic commands could be defined and implemented in accordance with specific design needs.

Figure 5:
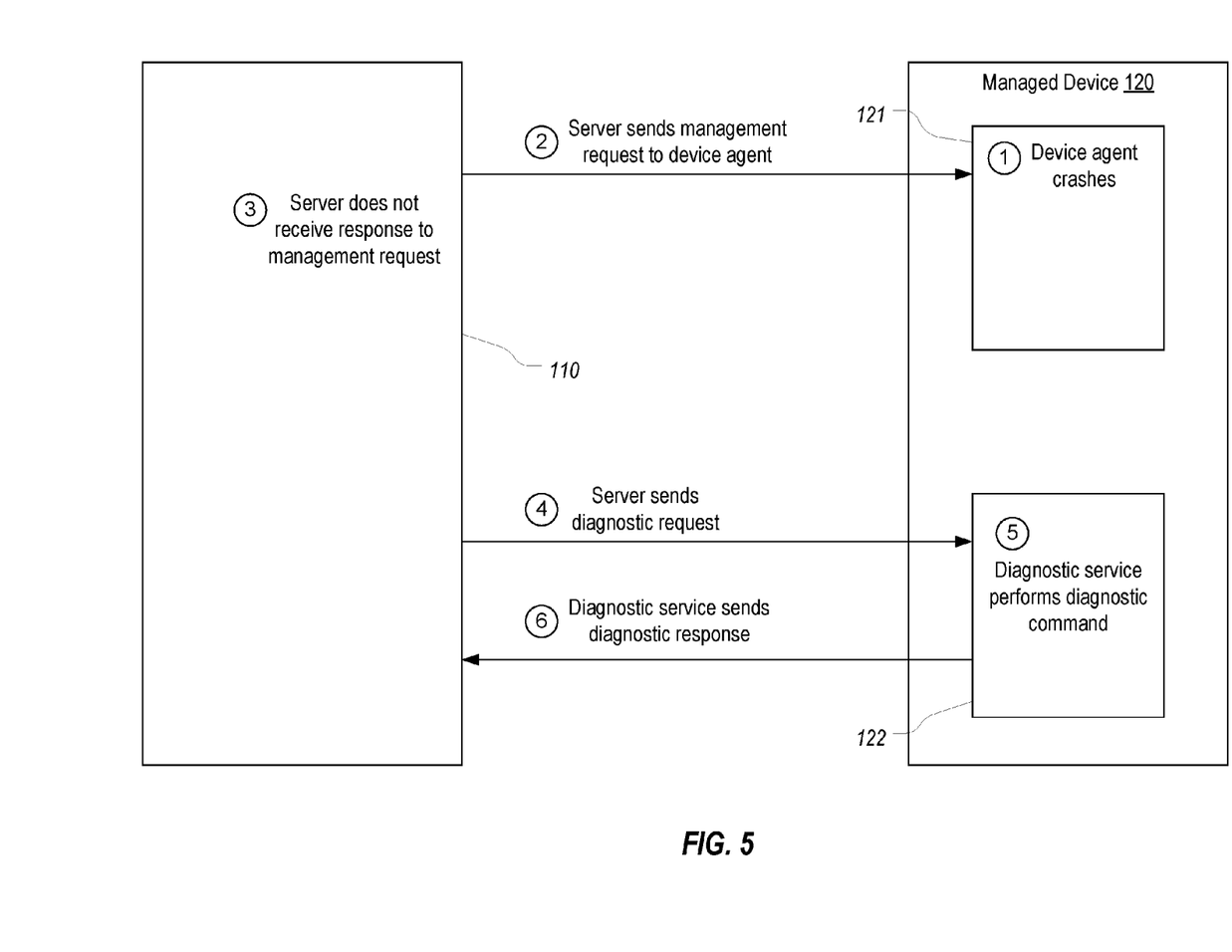
FIG. 5 illustrates an example scenario in which the management server may send a diagnostic request to the diagnostic service in order to diagnose an issue with the device agent.

FIG. 5 illustrates an example scenario in which management server 110 may communicate with diagnostic service 122 to remotely perform diagnostics on device agent 121. In FIG. 5, it will be assumed that both device agent 121 and diagnostic service 122 had previously been registered and were operating properly. However, at step 1, it is assumed that device agent 121 crashes. Then, in step 2, management server 110 sends a management request to device agent 121. Alternatively, device agent 121 may be configured to automatically provide responses on a periodic basis. In either case, in step 3, management server 110 fails to receive the appropriate response from device agent 121. Alternatively, device agent 121 could provide a response that indicates that it is not operating properly.

In any case, after step 1, management server 110 is no longer able to properly manage managed device 120 because it cannot communicate properly with device agent 121, a fact that management server 110 becomes aware of at step 3. In accordance with embodiments of the present invention, in step 4, management server 110 can send a diagnostic request to diagnostic service 122. In response, in step 5, diagnostic service 122 can perform the diagnostic action specified in the diagnostic request, and, in step 6, provide the appropriate diagnostic response. In some cases, steps 4-6 could be performed a number of times to obtain the appropriate diagnosis information to identify an issue that is preventing device agent 121 from operating properly and then provide appropriate commands which will address the identified issue. For example, management server 110 could employ diagnostic service 122 to obtain diagnostic information and then instruct diagnostic service 122 to restart, reset, or otherwise modify device agent 121. In this way, management server 110 will not only be able to monitor and manage managed device 120 but will also be able to monitor and manage device agent 121.

Figure 6:
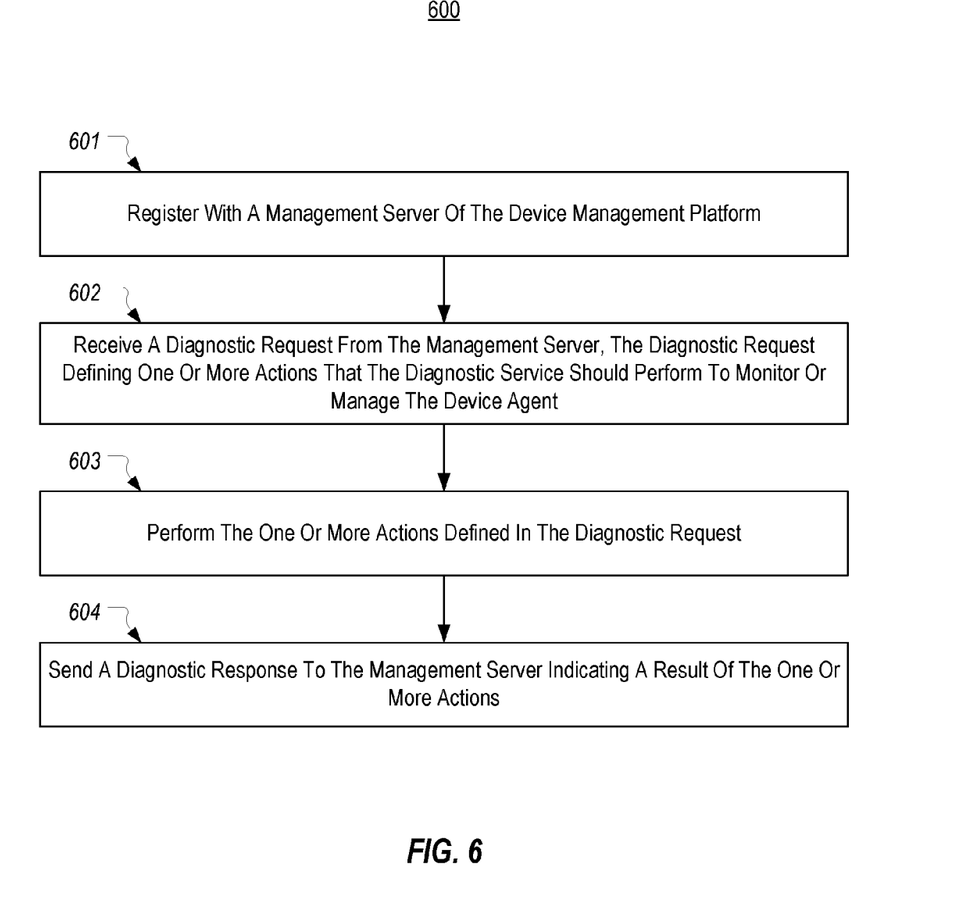
FIG. 6 illustrates a flowchart of an example method for enabling a device agent to be monitored and managed as part of a device management platform.

FIG. 6 provides a flowchart of an example method 600 for enabling a device agent to be monitored and managed as part of a device management platform. For example, method 600 can be implemented by diagnostic service 122.

Method 600 includes an act 601 of registering with a management server of the device management platform. For example, diagnostic service 122 can send a registration request to management server 110.

Method 600 includes an act 602 of receiving a diagnostic request from the management server, the diagnostic request defining one or more actions that the diagnostic service should perform to monitor or manage the device agent. For example, diagnostic service 122 can receive diagnostic request 301a or 401a.

Method 600 includes an act 603 of performing the one or more actions defined in the diagnostic request. For example, diagnostic service 122 can collect diagnostic information pertaining to device agent 121, start of stop device 121, etc.

Method 600 includes an act 604 of sending a diagnostic response to the management server indicating a result of the one or more actions. For example, diagnostic service 122 can send diagnostic response 301b or 401b to management server 110.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method implemented by a diagnostic service that is installed on a device that also includes a device agent for enabling the device agent to be monitored and managed as part of a device management platform that includes a management server, the method comprising:
   receiving, from the device agent, an authentication code, the device agent being configured to monitor or manage the device and to respond to management requests sent by the management server;
   registering with the management server of the device management platform to cause the management server to create an association between the device agent and the diagnostic service such that the management server can send diagnostic requests to the diagnostic service on the device when the device agent on the same device has become unresponsive, registering including sending a registration request that includes the authentication code received from the device agent to enable the management server to use the authentication code to create the association;
   receiving a diagnostic request from the management server, the diagnostic request defining one or more actions that the diagnostic service should perform to monitor or manage the device agent on the device;
   performing the one or more actions defined in the diagnostic request; and
   sending a diagnostic response to the management server indicating a result of the one or more actions.

2. The method of claim 1, wherein the authentication code identifies the device agent to the management server.

3. The method of claim 1, wherein the registration request also includes an identifier of the diagnostic service.

4. The method of claim 1, wherein the authentication code is generated by the management server using an identifier of the device agent.

5. The method of claim 1, wherein the one or more actions include collecting diagnostic information pertaining to the device agent.

6. The method of claim 5, wherein the diagnostic request includes a URL, the method further comprising:
   sending a communication that includes the collected diagnostic information to the URL.

7. The method of claim 1, wherein the one or more actions include stopping the device agent.

8. The method of claim 1, wherein the one or more actions include starting the device agent.

9. The method of claim 1, wherein the one or more actions include enabling a trace mechanism of the device agent.

10. The method of claim 1, wherein the one or more actions include sending an indication of a current health of the device agent to the management server.

11. The method of claim 1, wherein the one or more actions include sending current performance data of the device agent to the management server.

12. The method of claim 1, wherein the one or more actions include resetting the device agent to default settings.

13. A method implemented by a management server of a device management platform for employing a diagnostic service installed on a device to monitor and manage a device agent that is also installed on the device, the method comprising:
   as part of registering the device agent, sending the device agent an authentication code that is associated with the device agent, the device agent being configured to monitor or manage the device and to respond to management requests sent by the management server;
   receiving a registration request from the diagnostic service, the registration request including the authentication code and an identifier of the diagnostic service;
   employing the authentication code and the identifier of the diagnostic service to associate the device agent with the diagnostic service, wherein the association enables the management server to send diagnostic requests to the diagnostic service on the device when the device agent on the same device has become unresponsive; and
   upon detecting that the device agent on the device has become unresponsive, using the association to send a diagnostic request to the diagnostic service on the same device, the diagnostic request defining one or more actions that the diagnostic service should perform to monitor or manage the device agent.

14. The method of claim 13, wherein the authentication code is generated from an identifier of the device agent.

15. The method of claim 13, wherein the diagnostic request is sent in response to the device agent failing to communicate properly with the management server.

16. The method of claim 13, further comprising:
receiving a diagnostic response from the diagnostic service, the diagnostic response identifying a result of the one or more actions.

17. The method of claim 16, further comprising:
receiving a communication that includes diagnostic information pertaining to the device agent that was collected by the diagnostic service as part of performing the one or more actions.

18. The method of claim 13, wherein the one or more actions include one or more of:
collecting diagnostic information pertaining to the device agent;
stopping the device agent;
starting the device agent;
sending an indication of a current health of the device agent to the management server;
sending current performance data of the device agent to the management server; or
resetting the device agent to default settings.

19. The method of claim 13, wherein the diagnostic request specifies an identifier for the diagnostic request, the method further comprising:
receiving a diagnostic response from the diagnostic service that includes the identifier; and
employing the identifier in the diagnostic response to correlate the diagnostic response with the diagnostic request.

20. A device management platform comprising:
a management server;
a device agent installed on each of a plurality of devices, each device agent being configured to monitor or manage the device on which the device agent is installed and to respond to management requests sent by the management server; and
a diagnostic service installed on each of the plurality of devices, each diagnostic service being configured to monitor or manage the device agent that is installed on the device on which the diagnostic service is also installed, each diagnostic service also being configured to respond to diagnostic requests sent by the management server;
wherein the management server maintains an association between the device agent on a particular device and the diagnostic service on the same particular device to thereby allow the management server to send diagnostic requests to the diagnostic service on the particular device when the device agent on the particular device has become unresponsive.

* * * * *